United States Patent
Ryznic et al.

(10) Patent No.: US 8,858,161 B1
(45) Date of Patent: Oct. 14, 2014

(54) MULTIPLE STAGED COMPRESSOR WITH LAST STAGE AIRFOIL COOLING

(71) Applicants: John E. Ryznic, Palm Beach Gardens, FL (US); James P. Downs, Hobe Sound, FL (US); Joseph D. Brostmeyer, Jupiter, FL (US)

(72) Inventors: John E. Ryznic, Palm Beach Gardens, FL (US); James P. Downs, Hobe Sound, FL (US); Joseph D. Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 14/246,166

(22) Filed: Apr. 7, 2014

Related U.S. Application Data

(63) Continuation-in-part of application No. 13/946,003, filed on Jul. 19, 2013, now Pat. No. 8,721,265, and a continuation-in-part of application No. 13/904,629, filed on May 29, 2013, now Pat. No. 8,794,907, and a continuation-in-part of application No. 13/526,601, filed on Jun. 19, 2012, now Pat. No. 8,475,112, and a continuation-in-part of application No. 12/268,340, filed on Nov. 10, 2008, now Pat. No. 8,240,975.

(60) Provisional application No. 61/004,738, filed on Nov. 29, 2007.

(51) Int. Cl.
| | |
|---|---|
| *F01D 5/14* | (2006.01) |
| *F03B 11/00* | (2006.01) |
| *F03D 11/00* | (2006.01) |
| *F04D 29/36* | (2006.01) |
| *F01D 25/12* | (2006.01) |
| *F01D 15/10* | (2006.01) |

(52) U.S. Cl.
CPC ............... *F01D 25/12* (2013.01); *F01D 15/10* (2013.01)
USPC ............................................... 415/115; 415/1

(58) Field of Classification Search
USPC ....................................................... 415/1, 115
See application file for complete search history.

(56) References Cited

U.S. PATENT DOCUMENTS 6,098,395 A * 8/2000 North .............................. 60/782

* cited by examiner

*Primary Examiner* — David S Blum
(74) *Attorney, Agent, or Firm* — John Ryznic

(57) ABSTRACT

An industrial gas turbine engine in which a compressor includes later stage airfoils that are cooled using a coolant from an external closed loop cooling circuit or from a heat recovery steam generator. Cooling air compressed by a compressor external to the IGT engine can be used for cooling of the main compressor airfoils with a heat exchanger to preheat a fuel used in the combustor. Or, water and steam from a heat recover steam generator can be used to cool the compressor airfoils in which steam can be bled off from the steam generator for cooling and then reintroduced into the HRSG at a downstream stage. Steam is used to cool the rotor blades while water is used to cool the stator vanes.

8 Claims, 7 Drawing Sheets

MULTIPLE STAGED COMPRESSOR WITH LAST STAGE AIRFOIL COOLING

CROSS-REFERENCE TO RELATED APPLICATIONS

This application is a CONTINUATION-IN-PART of U.S. patent application Ser. No. 13/946,003 filed on Jul. 19, 2013, now U.S. Pat. No. 8,721,265, and which is a CONTINUATION-IN-PART of U.S. patent application Ser. No. 13/904,629, now U.S. Pat. No. 8,794,907, filed on May 29, 2013 and entitled MULTIPLE STAGED COMPRESSOR WITH LAST STAGE AIRFOIL COOLING; which is a CONTINUATION-IN-PART of U.S. patent application Ser. No. 13/526,601, now U.S. Pat. No. 8,240,975, filed on Jun. 19, 2012 and entitled MULTIPLE STAGED COMPRESSOR WITH LAST STAGE AIRFOIL COOLING; which is a CONTINUATION-IN-PART of U.S. patent application Ser. No. 12/268,340, now U.S. Pat. No. 8,240,975, filed on Nov. 10, 2008 and entitled MULTIPLE STAGED COMPRESSOR WITH LAST STAGE AIRFOIL COOLING; which claims the benefit to U.S. Provisional Application 61/004,738 filed on Nov. 29, 2007.

GOVERNMENT LICENSE RIGHTS

None.

BACKGROUND OF THE INVENTION

1. Field of the Invention

The present invention relates go gas turbine engines, and more specifically to a high pressure ratio compressor with last stage airfoil cooling used in a gas turbine engine.

2. Description of the Related Art Including Information Disclosed Under 37 CFR 1.97 and 1.98

A gas turbine engine, such as an aero engine used to power an aircraft or an industrial gas turbine engine used to produce electric power, is a very efficient power plant. The compressed air from a compressor is passed into a combustor where the air is burned with a fuel to produce a hot gas flow, the hot gas flow is then passed through a turbine to drive the rotor shaft connected to the compressor and, in the case of an aero engine produce thrust and/or drive the fan, or in the case of the IGT drive an electric generator to produce the electric power. In both cases, the efficiency of the engine can be increased by passing a higher temperature gas into the turbine.

Modern gas turbine engines have multiple stages in the compressor in order to produce the very high pressure ratios between the outlet of the compressor and the inlet. For example, the Pratt & Whitney F100 aero engine that is used to power the military F15 and F16 fighter aircraft includes 13 stages in the compressor and produces a pressure ratio of 30 to 1 (the outlet pressure is 30 times the inlet pressure). A higher pressure ratio will allow for higher efficiencies for the engine. With the recent improvements in compressor design, a higher number of stages can be used to produce an even higher pressure ratio. Futures aero engines are anticipated to have compressor ratios in the 50s.

However, as the air through the compressor is compressed, the temperature of the compressed air also increases. A multiple stage compressor will generally add 90 degrees F. to the compressed air for each stage. As the number of stages in the compressor grows, the compressor outlet air becomes higher to the point where the last stage airfoils (stator vanes and compressor blades) become so hot that the airfoils can be damaged from the high thermal load. Thus, there is a need in the prior art for a multiple stage compressor with a very high pressure ratio to have cooling of the last stage airfoils in the compressor in order to withstand the higher temperatures.

BRIEF SUMMARY OF THE INVENTION

A compressor in a gas turbine engine in which the compression ratio is so high that the last stage rotor blades and stator vanes require cooling to prevent overheating of these airfoils due to the higher air temperature resulting from the increased compression ratio produced by the engine. The last stage blades and vanes include internal cooling air passages to produce cooling through convection and impingement. The compressed air used for cooling these airfoils is bled off from an upstream stage of the compressor, passed through the airfoils for cooling, and then reintroduced into the compressor at an upper stage from where the bleed off air was first extracted.

Because the air pressure used for the cooling of the last stage airfoils is less than the external air flow pressure around these cooled air foils, the cooled air foils cannot include discharging film cooling air for cooling the exterior surface because of the differential pressure. The cooled airfoils are thus cooled by a closed system and the spent cooling air reintroduced into the compressor at a location upstream from the bleed off location.

In a second embodiment of the present invention, heat pipes located in the last stage or later stages airfoils are used to draw heat away from the airfoils, and the cooling air passes through heat exchanges associated with the heat pipes to remove heat and cool the airfoils.

In another embodiment, the cooling air used to cool the last stage airfoils can be used to preheat a fuel used in a combustor of the engine, where the fuel then cools the cooling air prior to being reintroduced into the compressor, preferably at a stage having a temperature close to the temperature of the cooled cooling air.

In still another embodiment, the cooling air of the last stage airfoils is cooled in a heat exchanger by passing fuel through, where the cooled cooling air is then passed through a last or near-last stage of a turbine to cool the airfoils.

In another embodiment, compressed air from the last stage of the compressor is first passed through a heat exchanger that uses fuel as the heat exchange fluid to preheat the fuel and cool the compressed air, where the cooled compressed air is then passed through the last stage vanes and blades of the compressor to provide cooling for these airfoils. The cooling air is then either reintroduced back into the compressor at an earlier stage or passed through a later stage airfoil in the turbine to provide cooling of these airfoils.

In another embodiment of the present invention, the later stage airfoils in the compressor can be cooled with cooling air supplied from a source external from the compressor such as a separate pump or from steam and water from a heat recovery steam generator or HRSG.

DETAILED DESCRIPTION OF THE INVENTION

The present invention is a multiple stage compressor that produces a very high pressure ratio such that cooling of the last stage or stages of the compressor air required. The compressor is intended to be used in a gas turbine engine such as an aero engine or an IGT engine. However, the present invention could be used in any turbomachine in which a multiple stage compressor is used that produces the high pressure ratio in which cooling of the last stage airfoils is required to prevent thermal damage.

Figure 1:
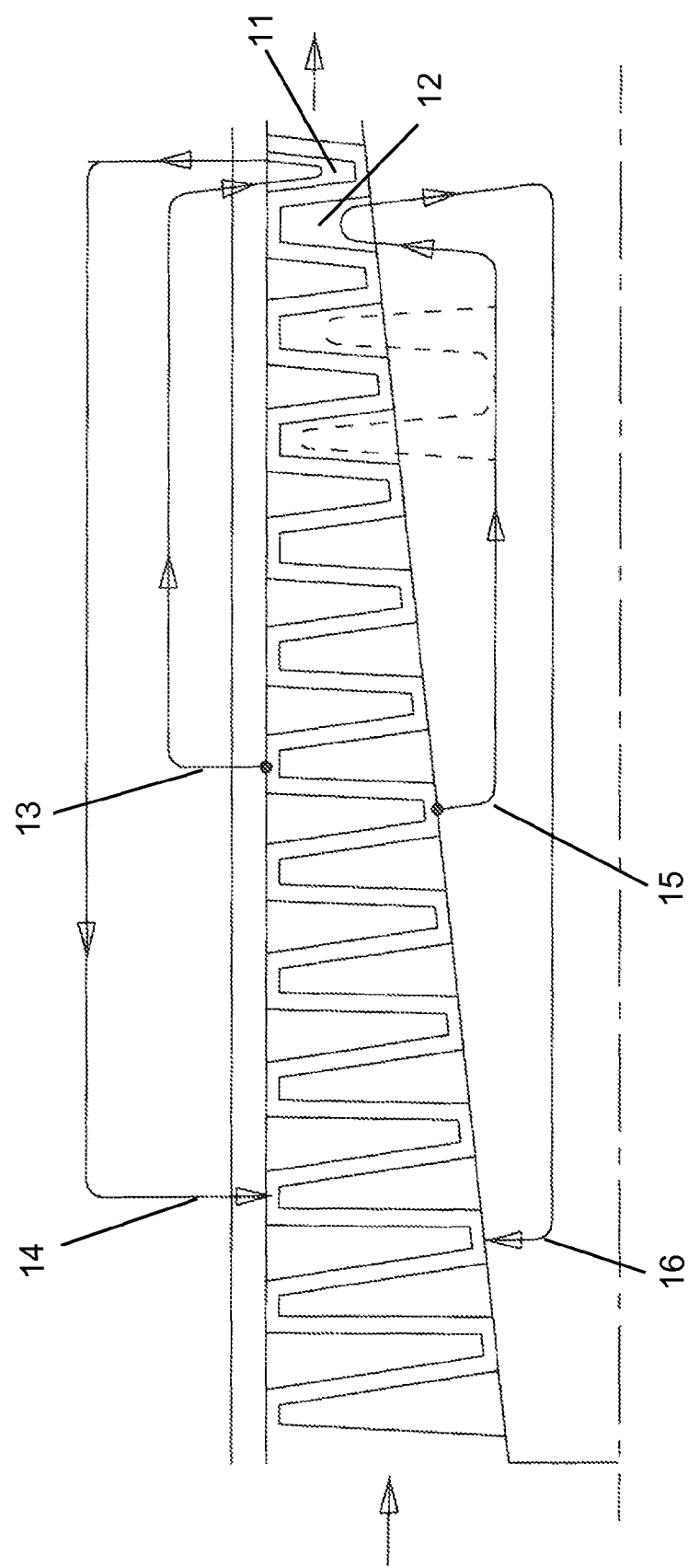
FIG. 1 shows a cross section view of a first embodiment of the multiple stage compressor of the present invention.

FIG. 1 shows a cross section of the compressor of the present invention in which a number of stages are present with each stage having a stator or guide vane located upstream from an associated rotor blade. In a typical multiple stage compressor of an aero engine, the outer diameter of the compressor is about at a constant radial diameter while the inner diameter is conical shaped with a decreasing airfoil spanwise height in the downstream direction. The inlet air to the compressor is at atmospheric pressure. The compressor progressively compresses the air as the compressed air passes through the multiple stages. As the air is compressed, the temperature of the compressed air increases. A typical compressor will increase the compressed air temperature about 90 degrees F. in each stage. In the last stages, the compressed air can be at such a high temperature that the airfoils can be damaged from the high temperature. The material properties of these airfoils are such that the high temperature compressed airs passing through these airfoils exceed the safe temperature level for the materials.

In the present invention is FIG. 1, the last stage vanes 12 and blades 11 include closed loop cooling air passages to pass cooling air through the airfoils without discharging the cooling air into the high temperature compressed air stream through the compressor. The internal airfoil cooling passages can be any type of prior art closed loop cooling passage circuit that makes use of well known convection cooling and impingement cooling of airfoils. Compressed cooling air from a middle stage 15 of the compressor is bled off and passed through a cooling air passage in the rotor shaft assembly and into the inlet of the internal cooling air passage of the rotor blade. The cooling air passes through the rotor blade cooling passage and then flows through a return air passage also in the rotor shaft to be discharged into the compressor at a stage 16 upstream from the bled off stage. This is due to the loss of pressure in the cooling air from passing through the cooling passages in the rotor shaft and the rotor blade.

To cool the last stage stator vane 11, cooling air is also bled off from the compressor at a middle stage 13 and directed through a cooling air passage and into the internal cooling air passage formed within the stator vane. The cooling air passes through the vane cooling passage, and is then directed through a return air cooling air passage and into the compressor at a stage 14 upstream from the bled off location. This is also due to the loss of pressure in the cooling air from passing through the cooling supply passages in the casing and the stator vane. The bleed off air used for cooling of the last stage airfoils is from the lowest stage that would produce enough pressure to pass through the cooling circuit for the airfoils while still allowing for the spent cooling air to be discharged into an upstream stage of the compressor. The further down the compressor stages that the cooling air is bled off from, the higher the temperature of the cooling air used to pass through the airfoils for cooling.

Bleeding off the compressed air used for the cooling and then re-supplying the cooling air back into the compressor minimizes the loss in the compressor. The heat picked up from the cooling air passing through the cooling passages within the airfoils is passed back into the compressor mainstream air. The only significant losses are due to the pressure loss from the cooling air passing through the cooling passages from the bleed off location to the re-supply location.

In other embodiments, other stages of the blades and vanes in the compressor can also be cooled by passing bleed off cooling air through the internal cooling passages and then re-supplying the cooling air to the compressor. The number of stages in the compressor that require cooling would depend upon the compressed air temperature passing through those stages. Also, the stage at which the cooling air is bled off will depend upon the required pressure for the cooling air that is needed to pass through the cooling air passages and be discharged back into the compressor. The re-supply locations will depend upon the pressure difference between the main stream compressed air and the re-supply cooling air. The re-supply cooling air must be at a higher pressure than the mainstream compressor air or a backflow will occur. Since the airfoil internal cooling passage is a closed loop passage (no cooling air is discharged from the airfoil out into the mainstream compressor air flow), the pressure of the cooling air can be lower than the pressure of the main stream compressed air passing through that airfoil.

Also, in another embodiment, the cooling air can be discharged into the turbine section to provide cooling for turbine airfoils such as rotor blades and stator vanes and then discharged into the hot gas flow passing through the turbine if the pressure differential is high enough to prevent backflow into the turbine airfoils.

In another embodiment, the cooling air from the compressor airfoils can be passed through a turbocharger to increase the pressure of the cooling air, and then passed into the combustor to be burned with the fuel. With this embodiment, the heated cooling air is burned with the fuel to produce the hot gas flow that is passed through the turbine to drive the rotor shaft.

Figure 2:
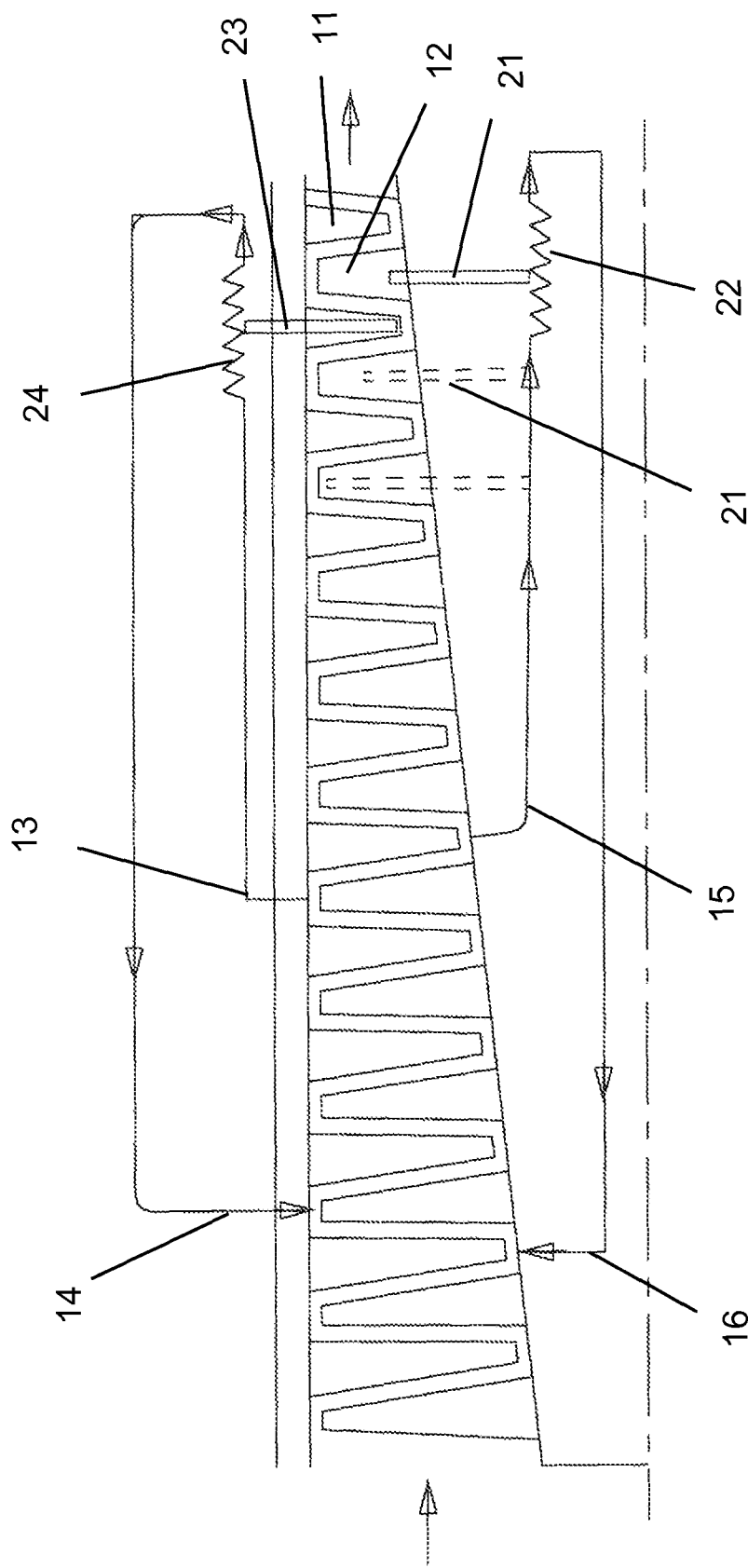
FIG. 2 shows a cross section view of a second embodiment of the multiple stage compressor of the present invention having heat pipes.

FIG. 2 shows an embodiment of the present invention in which the cooling air does not pass through the last stage airfoils. In the closed loop cooling circuit of FIG. 1, if an airfoil was to crack then the hot compressed air from the compressor can leak into the internal cooling passages of the last stage airfoils. To prevent this, the FIG. 2 embodiment uses heat pipes 21 and 23 that extend into the last stage airfoils 11 and 12 to draw heat away and into heat exchangers 22 and 24. The compressed air bled off from the compressor at 13 and 15 is passed through the heat exchangers 22 and 24 to draw heat away from the heat pipes 21 and 23 and thus the last stage airfoils 11 and 12 to cool the airfoils. With the use of heat pipes in the last stage airfoils 11 and 12, no high temperature compressed air can leak into the cooling air passages.

Figure 3:
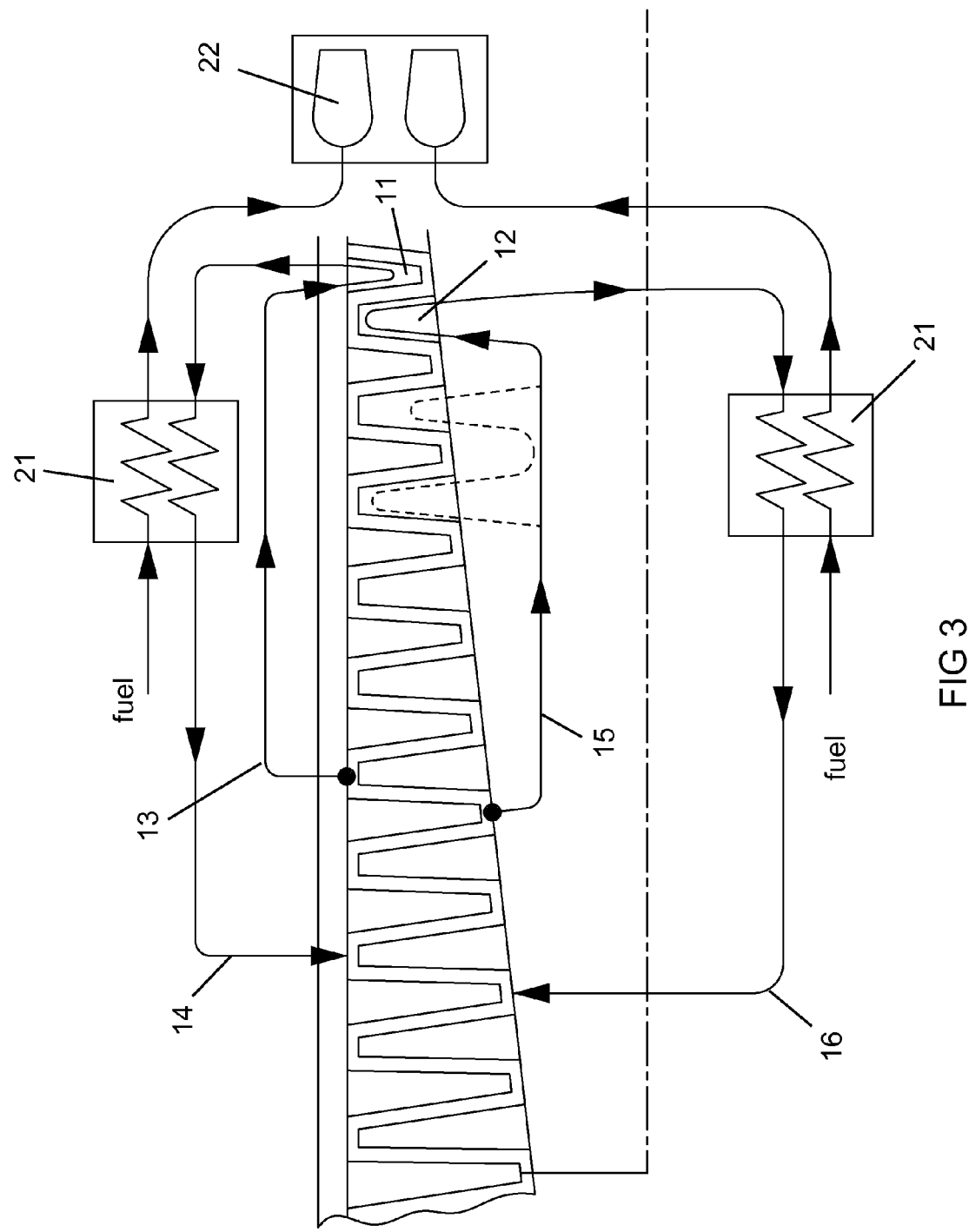
FIG. 3 shows a cross section view of a third embodiment of the multiple stage compressor of the present invention with a heat exchanger to use a fuel to cool down the cooling air from the last stage airfoils, where the fuel is then passed into a combustor and the cooled cooling air is reintroduced into the compressor.

In the FIG. 3 embodiment, a heat exchanger 21 is used to cool the cooling air from the last stage or near-to last stage airfoils prior to the cooled cooling air being reintroduced into the compressor. The fuel is thus preheated prior to passing into a combustor of the engine to be burned with compressed air from the compressor to produce a hot gas stream for the turbine. The cooling air bled off from one stage of the compressor in lines 13 and 15 is used to cool the stator vanes 12 and rotor blades 12, and then passed through the heat exchanger 21 and reintroduced into a lower pressure stage of the compressor through lines 14 and 16. It is preferable that the cooled cooling air be reintroduced into the stage of the compressor having close to the temperature of the cooled cooling air.

Figure 4:
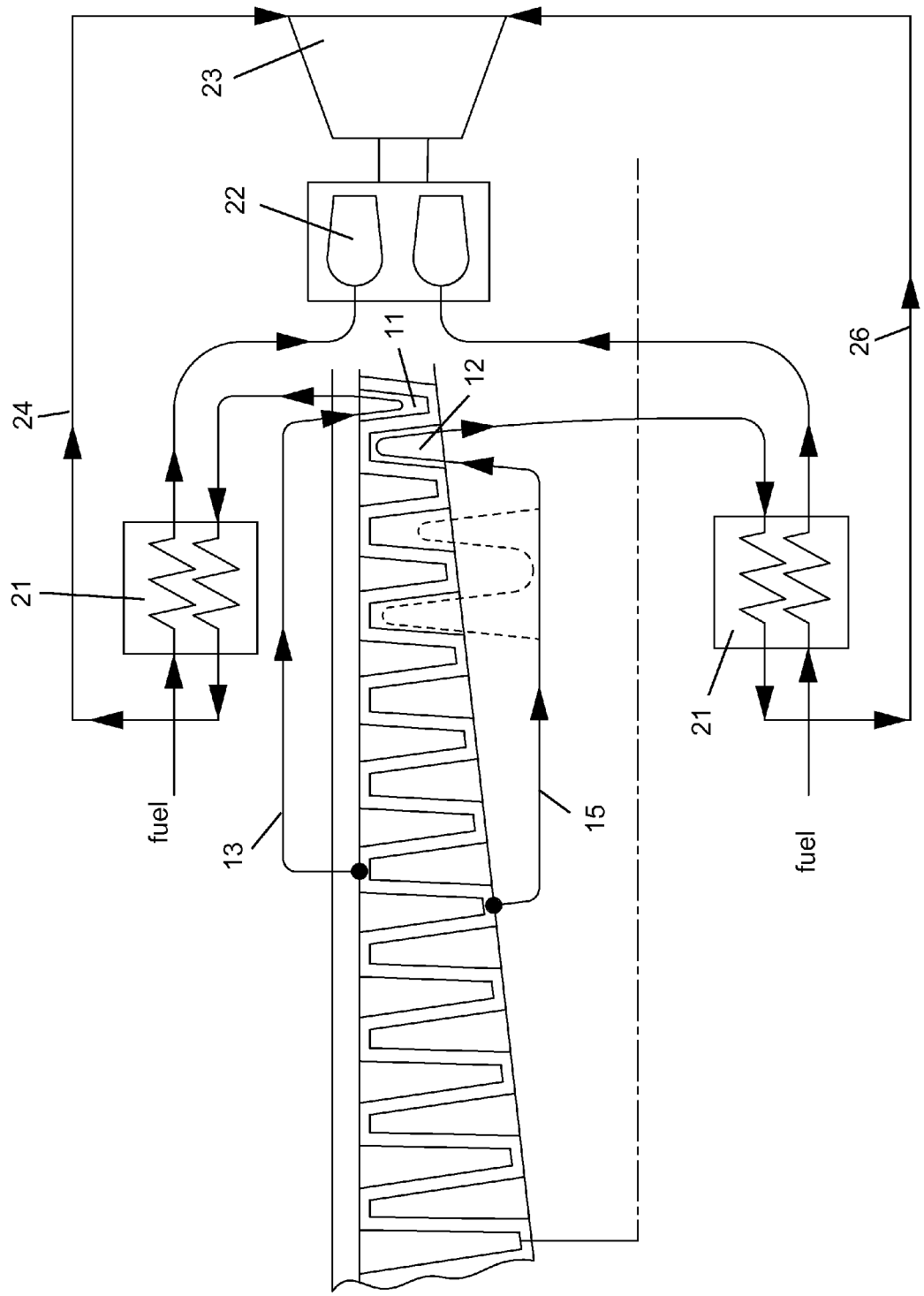
FIG. 4 shows a cross section view of a fourth embodiment of the multiple stage compressor of the present invention with a heat exchanger to use a fuel to cool down the cooling air from the last stage airfoils, where the fuel is then passed into a combustor and the cooled cooling air is used to cool airfoils in a last stage of a turbine.

In the FIG. 4 embodiment, the heat exchanger 21 is used to cool the cooling air from the last stage airfoils 11 and 12 and preheat the fuel prior to passing into the combustor 22, but the cooled cooling air is not reintroduced into the compressor but is used to provide cooling for last stage airfoils in the turbine 23 of the engine. Cooled cooling air in lines 24 and 26 is passed into the stator vanes and rotor blades of the turbine for cooling. The preheated fuel is passed into the combustor to produce the hot gas stream for the turbine 23.

Figure 5:
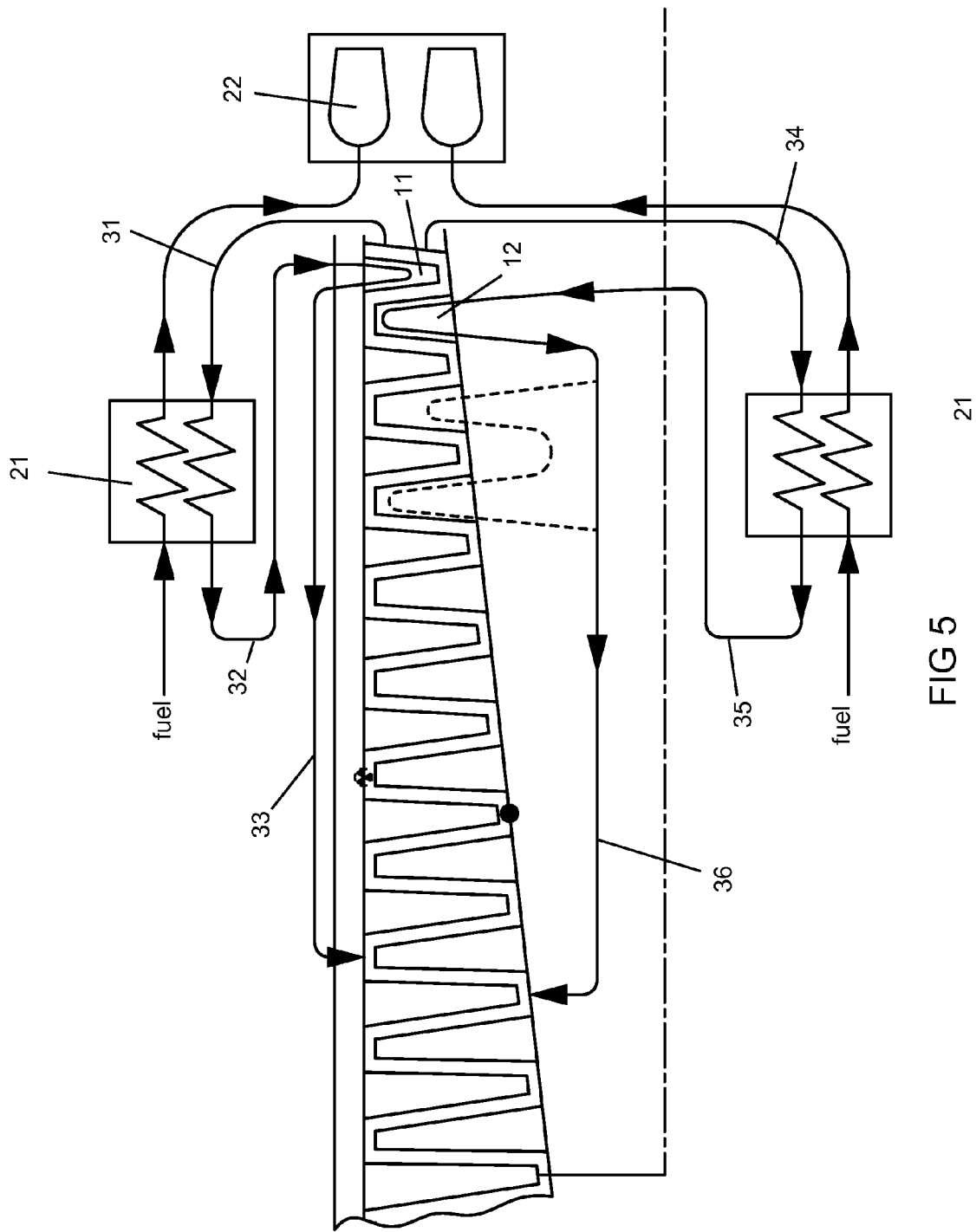
FIG. 5 shows cross section view of a fifth embodiment of the multiple stage compressor of the present invention where compressed air from the last stage of the compressor is passed through a heat exchanger to preheat a fuel with the cooled compressed air then passing through the last stage airfoils of the compressor to provide cooling, and where the cooling air is then reintroduced back into the compressor at an earlier stage.

FIG. 5 shows an embodiment of the present invention in which some of the compressed air from the last stage of the compressor is passed through the heat exchanger 21 to be cooled using fuel as the heat exchanger fluid that preheats the fuel prior to introduction into the combustor 22. The cooled compressed air is then passed through the last stage stator vanes 11 through line 32 and through the last stage rotor blades 12 through line 35 to provide cooling for the last stage airfoils on the compressor. The cooling air then flows through lines 33 and 36 to be reintroduced back into the compressor at an earlier stage having lower pressure. The preheated fuel is burned with the remaining compressed air discharged from the compressor last stage airfoils. The dashed lines in FIG. 5 represent other airfoils that can also be cooled using compressed air bled of from and cooled using the fuel in order to limit the metal temperature of these airfoils within the compressor.

Figure 6:
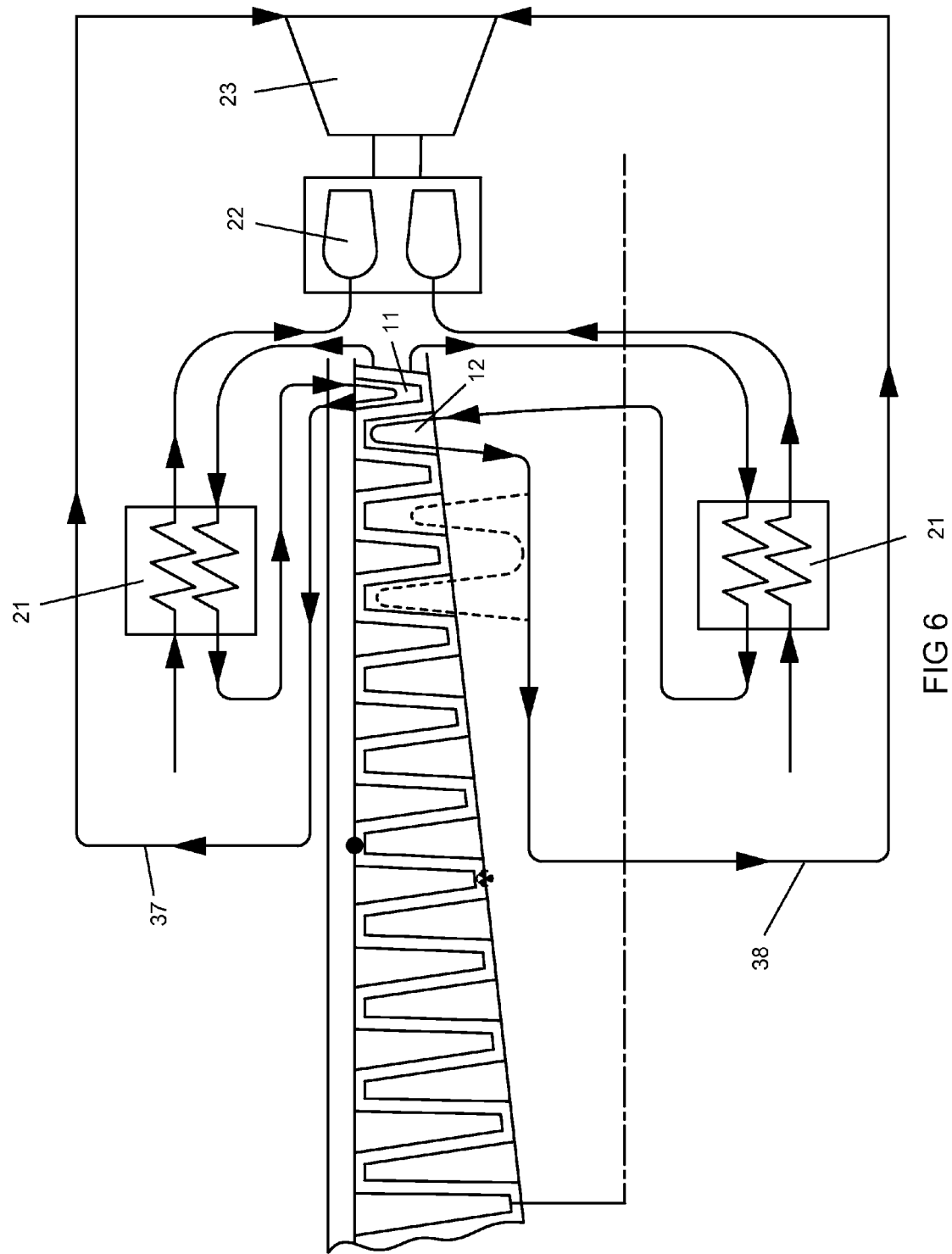
FIG. 6 shows cross section view of a sixth embodiment of the multiple stage compressor of the present invention where compressed air from the last stage of the compressor is passed through a heat exchanger to preheat a fuel with the cooled compressed air then passing through the last stage airfoils of the compressor to provide cooling, and where the cooling air is then passed through the last stage airfoils of the turbine to provide cooling.

FIG. 6 shows an embodiment of the present invention similar to FIG. 5 except that the cooling air from the airfoils in the compressor is not reintroduced back into the compressor but passed through airfoils within the turbine 23 that require cooling. The cooling air from the compressor will have a lower pressure than at the discharge end of the compressor and can be used to provide cooling for the last stage airfoils within the turbine or other stage airfoils. The cooling air for the turbine airfoils can also be passed into the hot gas stream through film holes or exit holes formed in the airfoils.

Figure 7:
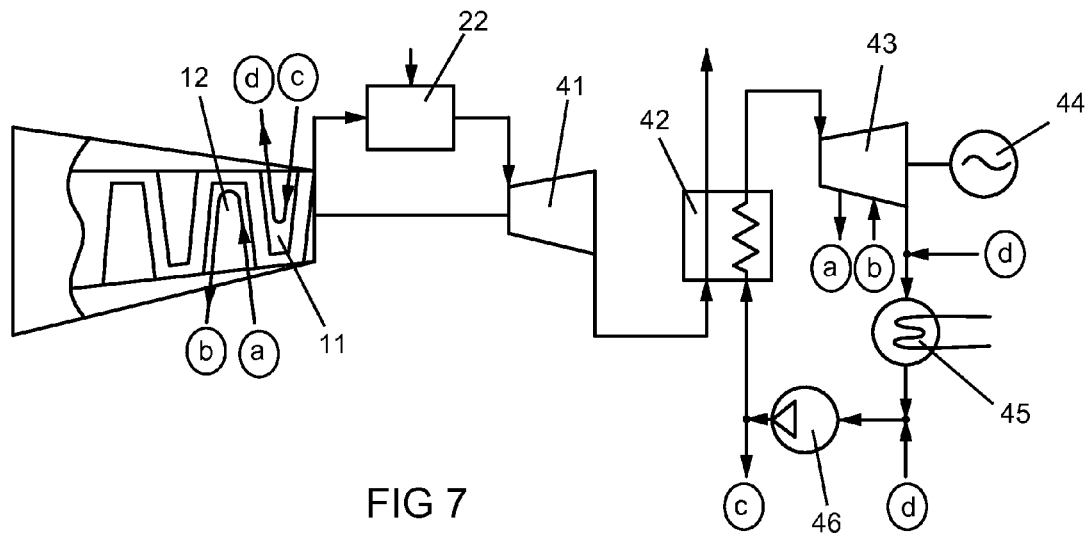
FIG. 7 shows a cross section view of a seventh embodiment of the multiple stage compressor of the present invention where compressed air and steam from a HRSG is used for the cooling fluid for the stator vanes and the rotor blades of the compressor.

FIG. 7 shows an embodiment of the present invention in which the coolant for the compressor airfoils comes from a source external from the main compressor. In this embodiment, the coolant comes from a HRSG (Heat Recovery Steam Generator) associated with the industrial gas turbine engine in which the compressor airfoils are cooled. Both steam and water can be used as the coolant where the steam provides cooling for the rotor blades while the water is used to cool the stator vanes. The HRSG includes a heat exchanger 42 that produces steam using the turbine 41 exhaust hot gas and passes the steam through a second turbine 43 that drives an electric generator 44. Exhaust gas from the second turbine 43 flows through a condenser 45 to convert the steam to water. A pump 46 pumps the water through the heart exchanger 42 to convert the water into steam.

Steam for the cooling of the rotor blades 12 can be bled off from the second turbine 43 at a stage where the steam pressure is high enough to prevent the hot gas stream passing through the compressor from flowing into the cooling circuit is a crack or hole opens up in the compressor airfoils being cooled. The steam used for cooling of the turbine blades 12 can then be reintroduced into the steam turbine 43 at a stage downstream from the bleed off location since the cooling fluid has been further heated after passing through the rotor blades 12.

Water used to cool the stator vanes 11 can be bled off from a location between the pump 46 outlet and the inlet of the heat exchanger 42 and returned to the closed loop circuit between the steam turbine 43 outlet and the condenser 45 inlet if the coolant has turned into steam or between the pump 46 inlet and the condenser 45 outlet if the coolant is water. The water coolant passing through the stator vanes 11 for cooling could be heated to the point where the water turns to steam. If the coolant heats up and remains water, then the water can be reintroduced into the closed loop circuit at the appropriate location.

Figure 8:
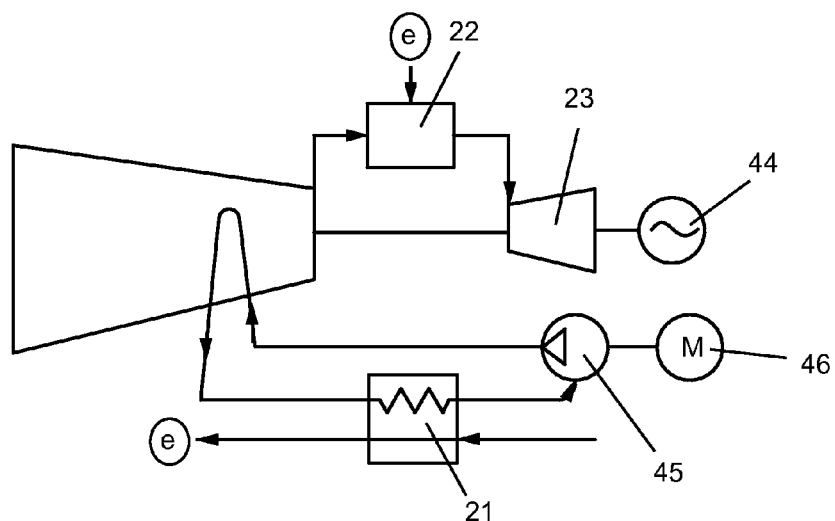
FIG. 8 shows a cross section view of an eighth embodiment of the multiple stage compressor of the present invention where the compressed air used for cooling of the compressor airfoils is supplied from an external compressor instead of from the main compressor of the gas turbine engine.

FIG. 8 shows an embodiment of the present invention where the cooling fluid for the compressor airfoils comes from a closed loop circuit with a compressor 45 driven by an electric motor that is separate from the gas turbine engine. A heat exchanger 21 is used to cool the cooling air while heating the fuel used in the combustor 22 of the gas turbine engine. The compressor airfoils cooled can be the rotor blades or the stator vanes.

The last stage airfoils in the compressor are usually exposed to the highest temperature from compressing the air, and thus require cooling. However, other stages of airfoils exposed to lower temperature but with longer lengths in the spanwise direction might require cooling in order to prolong part life than the shorter last stage airfoils. In other embodiments, the second to last or third to last stage of the compressor might require the cooling of the airfoils while allowing for the last stage airfoils to be uncooled.

We claim:

1. A gas turbine engine comprising:
   a multiple stage compressor with stages of stator vanes and rotor blades;
   a combustor;
   a turbine;
   a heat exchanger;
   a compressor driven by a motor;
   the compressor providing compressed air to the combustor that is burned with a fuel to produce a hot gas stream that is passed through the turbine; and, a closed loop cooling circuit passing through the compressor and the heat exchanger and a row of stator vanes or rotor blades of the multiple stage compressor to provide cooling for the row of stator vanes or rotor blades.

2. The gas turbine engine of claim 1, and further comprising:

the heat exchanger uses a fuel to cool the cooling air for the row of stator vanes or rotor blades while preheating the fuel prior to introduction into the combustor.

3. The gas turbine engine of claim 1, and further comprising:

the row of stator vanes or rotor blades is a last row of the compressor.

4. A power plant comprising:

an industrial gas turbine engine with a compressor and a combustor and a turbine to drive a first electric generator to produce electrical energy;

a heat recovery steam generator to produce steam from a turbine exhaust and drive a steam turbine to drive a second electric generator and produce electrical energy;

the compressor of the industrial gas turbine engine having a row of stator vanes or rotor blades with cooling passages formed therein;

the heat recovery steam turbine having a closed loop fluid path for water and steam that is used to drive the steam turbine; and, the cooling passages of the compressor connected to the heat recovery steam generator closed loop fluid path to provide cooling for the row of stator vanes or rotor blades of the compressor.

5. The power plant of claim 4, and further comprising:

the rotor of stator vanes is cooled with water from the heat recovery steam generator; and, the row of rotor blades is cooled with steam from the heat recovery steam generator.

6. The power plant of claim 4, and further comprising:

the row of rotor blades is cooled with steam from the heat recovery steam generator that is bled off from the steam turbine at a lower pressure and then reintroduced into the steam turbine at a stage having a higher pressure.

7. The power plant of claim 4, and further comprising:

the row of stator vanes is cooled with water from the heat recover steam generator; and, the water is turned to steam and reintroduced into the heat recovery steam generator at a location between the steam turbine outlet and a condenser inlet.

8. The power plant of claim 4, and further comprising:

the row of stator vanes is cooled with water from the heat recover steam generator closed loop fluid path; and, the water is reintroduced into the heat recovery steam generator closed loop fluid path at a location upstream or downstream from a pump.

* * * * *